May 19, 1970     J. A. CLEMENTS     3,512,936
LIQUID ANALYSIS METHOD AND APPARATUS THEREFOR
Filed Sept. 6, 1967
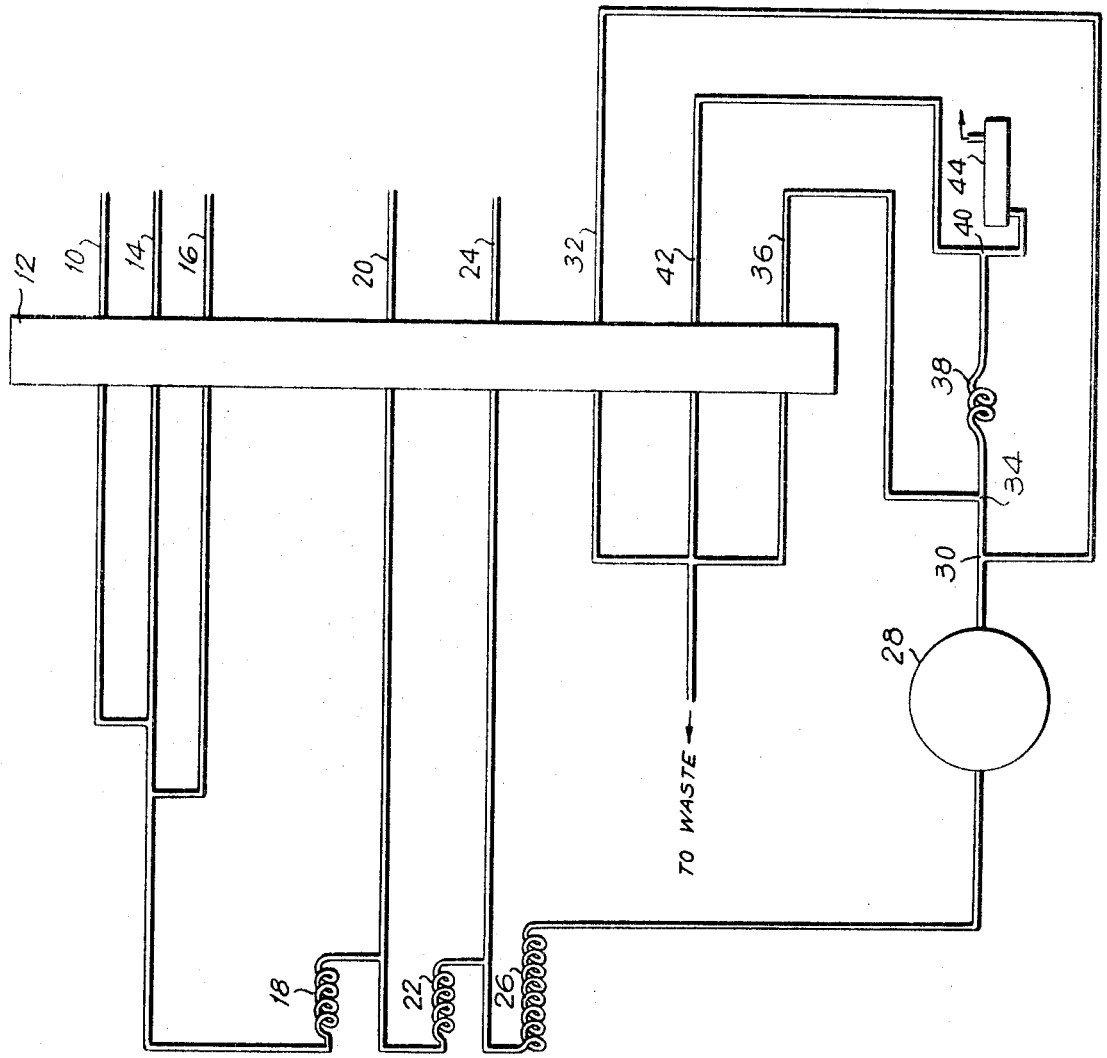
INVENTOR.
John A. Clements
BY
ATTORNEY United States Patent Office 3,512,936
Patented May 19, 1970

3,512,936
LIQUID ANALYSIS METHOD AND
APPARATUS THEREFOR
John A. Clements, Frankfurt am Main, Germany, assignor to Technicon Corporation, Ardsley, N.Y., a corporation of New York
Filed Sept. 6, 1967, Ser. No. 665,770
Int. Cl. G01n 1/18
U.S. Cl. 23—230                                      9 Claims

ABSTRACT OF THE DISCLOSURE

An automatic analysis system utilizing a flowing stream of sample liquid segments interspersed with gas segments is provided with means for blending together and reducing the volume of groups of sequential liquid segments. In a first T-fitting a large fraction of the volume of each liquid segment is withdrawn from the stream. In a second T-fitting a pluralities of successive gas segments are intermittently withdrawn from the stream. Finally the remaining gas segments are withdrawn and the stream is passed through a flow cell of colorimetric examination.

This invention relates to automatic analysis apparatus, and, more particularly, to such apparatus which includes a closed flow cell of a colorimeter for the colorimetric analysis of a liquid stream.

The invention is especially useful in its application to automatic continuous quantative analysis apparatus of the type described in U.S. Pat. No. 2,797,149 issued to Leonard T. Skeggs on June 25, 1957 wherein flowing streams of sample fluid are transmitted through small tubular manifolds. A relatively inert fluid, such as air, is introduced into the streams of sample fluid to divide them into a series of small segments of sample fluid which are spaced apart by such intervening segments of air. These segments of air serve to cleanse the interior walls of the manifold between sample segments, and to prevent diffusion between the adjacent flowing sample segments, all to preclude contamination by a preceding sample of a succeeding sample. The air segments also serve to compartimentalize incremental portions of sample and added thereto reagent for uniform intermixing.

In many industrial applications there are many samples to be analyzed at as rapid a rate as possible with the highest precision possible. However, each sample which is to be analyzed may be as large as is desired. To obtain maximum precision it is customary to blend together the several segments of each liquid sample before passing it through the sight passageway of the flow cell.

It is also customary to remove the air segments from the sample stream before it passes through the sight passageway of the flow cell to ensure that the volume of sample contained in the sight passageway is accurately read by the colorimeter. If air bubbles are present, the sample volume will absorb less light than it would otherwise.

There have been various approaches to this problem, involving blending of the sample segments and removal of the air segments before the sample is passed through the sight passageway of the flow cell, as shown for example in U.S. Pats. Nos. 3,109,713; 2,797,149; 2,879,141, for cleansing the fluid passages and thus providing wash in order to prevent contamination of an upstream part of a sample by surface-retained vestiges of a downstream part of a sample. In each of these patents all of the air segments are removed before the sample segments are blended.

It is an object of this invention to provide a method and an apparatus therefor, for providing improved precision of analysis of various liquids.

A feature of this invention is the removal of a fraction of each intrasample liquid segment from the flowing stream of liquid samples after the stream has been treated, as by reagents, for analysis, which results in shrinking the liquid segments, but not reducing their number. A number of successive air segments, from a plurality equal to such number plus one, is then regularly removed from the flowing stream. Thereupon, the number of shrunk liquid segments which are no longer spaced apart by the now removed air segments, merge to form an intrasample liquid segment of substantially the original liquid segment size. The remaining air segment is finally withdrawn just before the stream enters the sight passageway of the flow cell of the colorimeter.

These and other objective features and advantages of the invention will become apparent from the following specification thereof taken in conjunction with the accompanying drawing in which:

The figure is a flow diagram of an embodiment of this invention.

An exemplary apparatus is shown in the figure for use with a sample stream in an industrial monitoring application. In such an arrangement there are not any individual samples, merely a continuous flowing stream of sample which is to be continuously analyzed. If, alternately, a plurality of samples is to be analyzed, then a sample supply device, such as is shown, for example, is U.S. Pat. No. 3,038,340, may be utilized to provide a flowing stream of sequential liquid samples, each spaced from another by an inter-sample air segment. In either event, the sample stream is transmitted to the inlet of a pump tube 10, which is one of a plurality of pump tubes in a proportioning pump 12, such as is shown, for example, in U.S. Pat. No. 2,935,028. Such a pump has a plurality of rollers which progressively occlude the lengths of the pump tubes to positively displace predetermined volumes of fluid through the tubes. A pump tube 14 has its inlet coupled to a supply of a first reagent, and a pump tube 16 has its inlet coupled to the atmosphere or some other supply of a relatively inert gas. The outlets of the pump tubes 12, 14 and 16 are coupled to the inlet of a mixing coil 18, such as is shown, for example, in U.S. Pat. No. 2,933,293.

A pump tube 20 has its inlet coupled to a supply of a second reagent, and its outlet, together with the outlet of the first mixing coil 18, coupled to the inlet of a second mixing coil 22. A pump tube 24 has its inlet coupled to a supply of a third reagent and its outlet, together with the outlet of the second mixing coil 22, coupled to the inlet of a third mixing coil 26. The outlet of the third mixing coil is coupled to the inlet of a heating bath 28, such as is shown, for example, in U.S. Pat. No. 3,057,603. The outlet of the heating bath is coupled to the inlet of a first T-fitting 30, such as is shown, for example, in FIG. 4, of U.S. Pat. No. 3,047,367. The downward outlet of this fitting is coupled to the inlet of a pump tube 32 which discharges to waste. The horizontal outlet of this fitting is coupled to the inlet of a second T-fitting 34, such as is shown, for example, in FIG. 3 of U.S. Pat. No. 3,047,367. The upward outlet of the fitting is coupled to a pump tube 36 which discharges to waste.

The horizontal outlet of the T-fitting 34 is coupled to the inlet of a mixing coil 38 whose outlet is coupled to the inlet of a T-fitting 40. The upward outlet of this fitting is coupled to a pump tube 42 which discharges to waste. The downward outlet of this fitting is connected as closely as possible to the inlet of the sight passageway 44 of the flow cell of the colorimeter, such as is shown, for example, in U.S. Pat. No. 3,236,602; or, advantageously, the fitting 38 and the sight passageway 44 may be made integral, as shown in the U.S. patent application S.N. 556,749, filed June 10, 1966 by Leonard T. Skeggs, and assigned to a common assignee.

Exemplary pump tube internal diameters are: 10–0.065″, 14–0.065″, 16–0.073″, 20–0.065″, 24–0.065″, 32–0.110″, 42–0.040″, 34–0.73″. Various other arrangements of components may be provided, depending on the constituent to be determined. Such components might include dialyzers, filters, heaters, solvent extractors etc.

In the first T-fitting 30, a fraction, advantageously about 80% of the volume of each liquid segment is drawn downwardly to waste, while 20% of the volume of each liquid segment and all of the volume of each air segment is passed horizontally on to the second T-fitting 34. The passed on flow thus contains liquid segments which have been each shrunk in volume, but which have not been reduced in number.

In the second T-fitting 34, a number of successive air segments, from a plurality equal to such number plus one, is then regularly removed from the flowing stream. It is desirable to maintain the original liquid to air ratio, therefore, advantageously, the first four out of every five air segments are drawn upwardly to waste, while the fifth air segments is passed horizontally on to the mixing coil 38. Adjustment of the temperature of the heating bath 28 provides a change in the volume of the air segments, and thereby affords a convenient, fine adjustment of the rate at which air is drawn up the second T-fitting to waste. A relatively small quantity of liquid is drawn up the second T-fitting with the air to waste. The merged new segment between two remaining air segments is homogenized or blended in the mixing coil. These remaining air segments prevent unlimited diffusion through the length of the flowing stream and continue to serve as a means to cleanse the interior of mixing coil.

In the third T-fitting 40, the remaining air segments are drawn up to waste and the remaining liquid is passed through the sight passageway of the flow cell, whereat its transmittance is measured.

It will be appreciated that the "wash" obtained through the main part of the system, i.e. up to the second T-fitting 34 is the same as in the prior art systems. A few of the original air segments must be retained for an adequate wash. When liquid segments are combined, wash is reduced. However, precision is gained by the averaging out of imperfections or variations in the chemistry from segment to segment. If high precision is the most important factor and more wash is available than is required, as in cases where the unknown concentration varies only a few percent out of many, e.g. 30±1%, than the wash can be safely reduced to gain an increase in precision.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. In a method of sample liquid treatment and analysis in which the sample liquid is transmitted as a flowing stream and is treated while in transit for analysis, and which treatment includes the introduction into such flowing stream of a plurality of spaced apart relatively inert separable fluid segments whereby the flowing stream is comprised of sequential, alternate segments of sample liquid and inert fluid, the improvement comprising: after the treatment for analysis, initially removing a predetermined fractional portion of each treated sample liquid segment in the flowing stream, thereby shrinking each sample liquid segment without reducing the number of such sample liquid segments; subsequently regularly removing from the flowing stream a number of successive inert fluid segments, from a plurality equal to such number plus one, whereupon the number of shrunk liquid segments which are no longer spaced apart by the now removed inert fluid segments merge to form a combined sample liquid segment; homogenizing each combined sample liquid segment; and subsequently removing all remaining inert fluid segments and transmitting said homogenized liquid segments directly through an analysis apparatus.

2. A method according to claim 1 wherein immediately after said removal of said remaining inert fluid segments said homogenized liquid segments are transmitted through the sight passageway of a flow cell.

3. A method according to claim 1 wherein said relatively inert fluid is a gas.

4. A method according to claim 1 wherein said number of inert fluid segments which is regularly removed is adjusted so that the volume of each said combined sample liquid segment is substantially equal to the volume of each of said original treated sample liquid segments.

5. A method according to claim 4 wherein said inert fluid segments are withdrawn from said flowing stream at a constant volumetric rate, the number being regularly removed being responsive to the difference between the volumetric rate of withdrawal from said stream and the volumetric rate of delivery by said stream of said inert fluid segments.

6. A method according to claim 5 wherein said flowing stream is heated to adjust the volume of each delivered inert fluid segment.

7. Apparatus for sample liquid treatment and analysis in which the sample liquid is transmitted as a flowing stream and is treated while in transit for analysis; said apparatus including tubular means through which the stream flows; means for introducing an inert separable fluid into said liquid stream in said tubular means to divide said stream into a segmented stream comprised of a series of liquid segments separated by intervening segments of said inert fluid; means for treating said series of liquid segments in said stream; a flow cell comprising a closed tubular chamber having a peripheral wall provided with a liquid inlet to receive liquid from said tubular means and with a liquid outlet and otherwise closed to the passage of fluid; first means in communication with said tubular means at a point downstream of said treating means and upstream of said flow cell for removing a fractional portion of each sample liquid segment; second means in communication with said tubular means at a point upstream of said flow cell and downstream of said first means for regularly removing a number of successive inert fluid segments, from a plurality equal to such number plus one, whereupon the successive liquid segments between each two successive remaining inert fluid segments merge to form a combined sample liquid segment; mixing means in communication with said tubular means at a point upstream of said flow cell and downstream of said second means for homogenizing each combined sample liquid segment; and third means in communication with said tubular means at a point closely upstream of said flow cell and downstream of said mixing means for removing all remaining inert fluid segments.

8. Apparatus according to claim 7 wherein said second means is a three legged junction having an upwardly directed leg coupled to a source of negative pressure; the volumetric rate of flow developed at said upwardly directed leg being less than the volumetric rate of flow of the inert fluid segments.

9. Apparatus according to claim 8 further including a heating bath coupled to said tubular means at a point upstream of said second means for heating the inert fluid segments and adjusting their volume.

References Cited

UNITED STATES PATENTS

| | | | |
|---|---|---|---|
| 2,967,764 | 1/1961 | Skeggs | 23—253 |
| 3,109,713 | 11/1963 | Ferrari et al. | 23—253 |
| 3,109,714 | 11/1963 | Skeggs | 23—253 |
| 3,116,754 | 1/1964 | Ferrari | 23—253 XR |
| 3,241,921 | 3/1966 | Ferrari | 23—253 |
| 3,241,923 | 3/1966 | Ferrari | 23—253 XR |

MORRIS O. WOLK, Primary Examiner

R. E. SERWIN, Assistant Examiner

U.S. Cl. X.R.

23—253, 259